United States Patent
Pillai et al.

(10) Patent No.: US 9,654,510 B1
(45) Date of Patent: May 16, 2017

(54) MATCH SIGNATURE RECOGNITION FOR DETECTING FALSE POSITIVE INCIDENTS AND IMPROVING POST-INCIDENT REMEDIATION

(71) Applicant: SYMANTEC CORPORATION, Mountain View, CA (US)

(72) Inventors: Binu Chandrasekara Pillai, Sunnyvale, CA (US); Ramzi Abi Antoun, San Francisco, CA (US); Yuval Tarsi, Lafayette, CA (US)

(73) Assignee: Symantec Corporation, Mountain View, CA (US)

( * ) Notice: Subject to any disclaimer, the term of this patent is extended or adjusted under 35 U.S.C. 154(b) by 58 days.

(21) Appl. No.: 14/618,896

(22) Filed: Feb. 10, 2015

(51) Int. Cl.
*H04L 29/06* (2006.01)

(52) U.S. Cl.
CPC .................. *H04L 63/20* (2013.01)

(58) Field of Classification Search
CPC ........................................................ H04L 63/20
See application file for complete search history.

(56) References Cited

U.S. PATENT DOCUMENTS

| | | | | |
|---|---|---|---|---|
| 8,473,442 B1 * | 6/2013 | Deninger | ................. | G06N 5/02 706/47 |
| 8,607,066 B1 * | 12/2013 | Kailash | ............... | H04L 63/1441 713/188 |
| 8,799,287 B1 * | 8/2014 | Barile | ............... | G06F 17/30707 707/738 |
| 8,898,779 B1 * | 11/2014 | Jaiswal | ................... | G06F 21/60 726/1 |
| 8,990,882 B1 * | 3/2015 | Koshy | ..................... | G06F 21/62 713/165 |
| 9,043,247 B1 * | 5/2015 | Hart | .................. | G06F 17/30705 706/12 |
| 9,146,704 B1 * | 9/2015 | Lin | ........................ | H04W 12/12 |
| 9,183,384 B1 * | 11/2015 | Bruhmuller | ........... | G06F 21/552 |
| 9,203,623 B1 * | 12/2015 | Lin | .......................... | G06F 21/56 |
| 9,317,679 B1 * | 4/2016 | Bhatkar | .................. | G06F 21/50 |
| 2010/0254615 A1 * | 10/2010 | Kantor | ................. | G06K 9/6201 382/218 |
| 2011/0239306 A1 * | 9/2011 | Avni | ....................... | G06F 21/54 726/26 |
| 2012/0324220 A1 * | 12/2012 | Norton | ................ | G06F 21/6245 713/165 |
| 2013/0204903 A1 * | 8/2013 | Hao | .................. | G06F 17/30109 707/802 |
| 2013/0212710 A1 * | 8/2013 | Puttaswamy Naga | ................... | H04L 63/0245 726/30 |

(Continued)

*Primary Examiner* — Kaveh Abrishamkar
(74) *Attorney, Agent, or Firm* — Patterson + Sheridan, LLP

(57) ABSTRACT

The present disclosure relates to using signatures in a data loss prevention system. According to one embodiment, a DLP system identifies an occurrence of a data loss prevention (DLP) incident triggered by content and a DLP rule. The DLP system generates a first signature representing the DLP incident based on a specific pattern inherent to the content which triggered the DLP incident. The DLP system compares the first signature to one or more second signatures generated from other DLP incidents associated with the DLP rule. Upon determining the first signature matches at least one of the second signatures, the DLP system assigns an event status of the second matching signature to the first signature.

12 Claims, 9 Drawing Sheets

(56) References Cited

U.S. PATENT DOCUMENTS

| | | | | |
|---|---|---|---|---|
| 2013/0246334 A1* | 9/2013 | Ahuja | ............... | G06F 17/30713 707/600 |
| 2013/0246337 A1* | 9/2013 | Ahuja | ............... | G06F 17/30737 707/601 |
| 2013/0246371 A1* | 9/2013 | Ahuja | ............... | G06F 17/30613 707/692 |
| 2013/0246424 A1* | 9/2013 | Deninger | ................. | G06N 5/02 707/737 |
| 2013/0304690 A1* | 11/2013 | Perlmutter | ............... | G06N 5/02 706/48 |
| 2014/0026182 A1* | 1/2014 | Pearl | ....................... | G06F 21/60 726/1 |
| 2014/0173724 A1* | 6/2014 | Lingafelt | .............. | G06F 21/552 726/22 |
| 2014/0173727 A1* | 6/2014 | Lingafelt | .............. | G06F 21/552 726/22 |
| 2014/0304197 A1* | 10/2014 | Jaiswal | ............... | G06F 21/6209 706/12 |
| 2015/0356445 A1* | 12/2015 | Lingafelt | ................ | H04L 41/00 706/47 |

* cited by examiner

MATCH SIGNATURE RECOGNITION FOR DETECTING FALSE POSITIVE INCIDENTS AND IMPROVING POST-INCIDENT REMEDIATION

BACKGROUND

Field

Embodiments presented herein generally relate to data loss prevention systems, and more specifically, to using DLP incident signatures to recognize false positive events generated by a DLP system.

Description of the Related Art

Data loss prevention (DLP) systems protect sensitive data from disclosure or misuse. To do so, DLP systems may monitor content leaving a network (sometimes referred to as "network DLP" or "data in motion DLP") or use of content within a network (sometimes referred to as "endpoint DLP" or "data in use DLP"). For example, DLP systems may prevent personally identifiable information, such as Social Security numbers, bank account numbers, payment card information, and so on from being transmitted between users in an insecure manner (e.g., in an e-mail) or otherwise made public (e.g., on the Internet). In other cases, DLP systems may prevent users from transmitting confidential information, such as financial information, proprietary product information, source code, or other protected data, as well as prevent unauthorized copies from being created (e.g., copying a document to a portable storage device). For example, an organization may separate data access to relevant groups (e.g., equities analysts and equities sales teams), and DLP systems may prevent one group from accessing confidential information from others group that could be used for unethical or illegal purposes (e.g., an equities sales team accessing information from an analyst team for insider trading purposes). As another example, DLP systems may prevent source code, product development plans, or other confidential information from leaving the organization (whether by way of e-mail, by copying to removable media or to an online repository, etc.).

Generally, DLP systems are tuned to err on the side of caution in determining whether an event matches rules restricting transmission or access to data. False positives, i.e., events incorrectly flagging an event as violating a DLP rule, are generally favored over false negatives, i.e., failing to correctly flag an event as violating a DLP rule. Since an administrator can review incidents, a delay in transmitting data falsely flagged as violating a DLP rule is generally considered acceptable to ensure that sensitive data is not transmitted in violation of data security rules.

However, as a result, DLP systems often generate large numbers of false positive events, consuming storage resources on the DLP system. This results in an administrator spending significant amounts of time simply identifying false positive events one-by-one.

SUMMARY

One embodiment of the present disclosure includes a method for preventing data loss in a network. The method generally includes identifying an occurrence of a data loss prevention (DLP) incident triggered by content and an associated DLP rule. A first signature representing the DLP incident is generated based on the content which triggered the DLP incident. The first signature is compared to one or more second signatures generated from other DLP incidents associated with the DLP rule. Upon determining the first signature matches at least one of the second signatures, an event status of the second matching signature is assigned to the first signature.

In a particular embodiment, the status of the matching second signature is a false positive. The operations further include performing an action with the content associated with the DLP incident, where the action would otherwise have been blocked as a result o the DLP incident.

In a particular embodiment, the performing the action may be sending an email which includes the content, copying a document which includes the content to a portable storage device, or copying the content from a document to another document. Further, the method may also include, upon determining the first signature does match at least one of the second signatures, quarantining the event. In such a case, the method may further include receiving input indicating the event is a false positive, and assigning an event status of a false positive to the first signature.

In a particular embodiment, the method further comprises identifying a collection of DLP incidents matching a specified one of the second signatures and identifying a root DLP incident in the collection of DLP incidents. The collection of DLP incidents is grouped relative to the root DLP incidents.

Another embodiment provides a computer-readable storage medium having instructions, which, when executed on a processor, performs an operation for preventing data loss in a network. The operation generally includes identifying an occurrence of a data loss prevention (DLP) incident triggered by content and an associated DLP rule. A first signature representing the DLP incident is generated based on the content which triggered the DLP incident. The first signature is compared to one or more second signatures generated from other DLP incidents associated with the DLP rule. Upon determining the first signature matches at least one of the second signatures, an event status of the second matching signature is assigned to the first signature.

Still another embodiment of the present invention includes a processor and a memory storing a program, which, when executed on the processor, performs an operation for managing assertions. The operation generally includes identifying an occurrence of a data loss prevention (DLP) incident triggered by content and an associated DLP rule. A first signature representing the DLP incident is generated based on the content which triggered the DLP incident. The first signature is compared to one or more second signatures generated from other DLP incidents associated with the DLP rule. Upon determining the first signature matches at least one of the second signatures, an event status of the second matching signature is assigned to the first signature.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
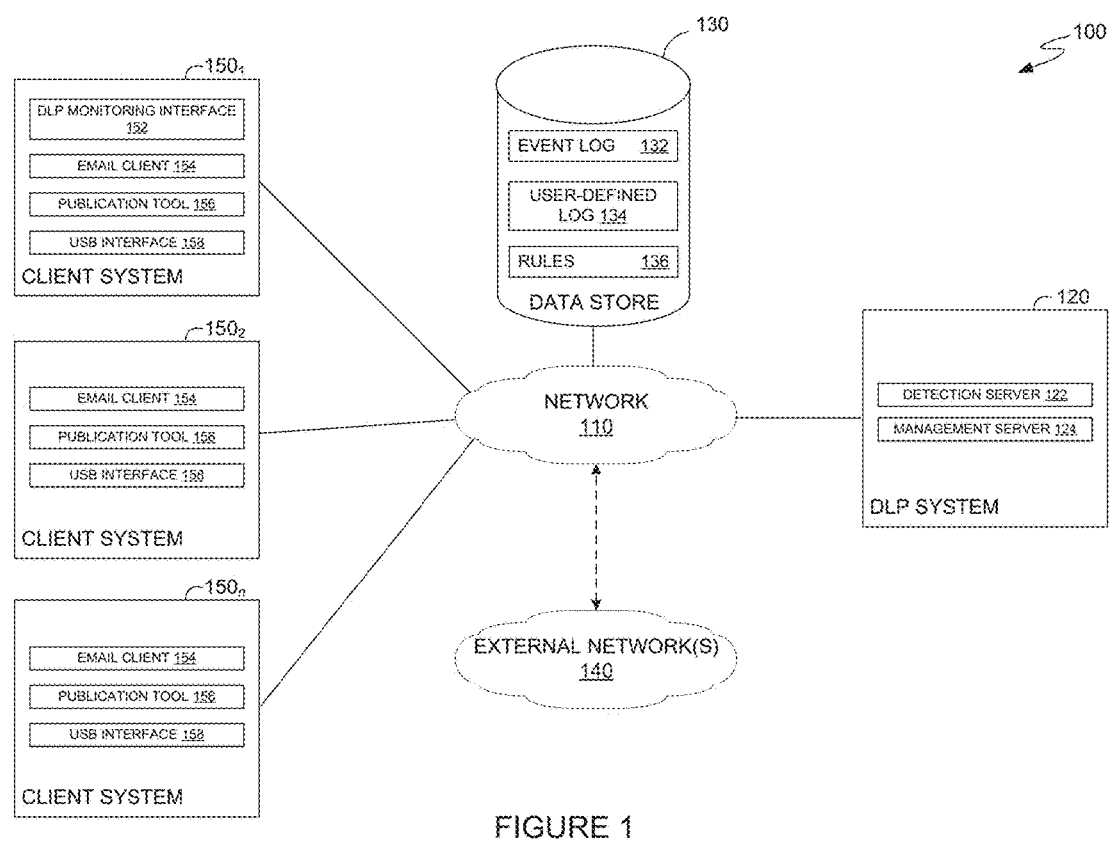
FIG. 1 illustrates an example of a networked computing environment, according to one embodiment.

Embodiments presented herein describe techniques for generating signatures to represent DLP incidents. For example, a signature may be generated from text content in a document that triggered a DLP incident. That is, the signature is used to identify a particular DLP incident, based on the underlying content that triggered the incident. Depending on the rule, certain uses of that content can be blocked or logged. For example, a DLP rule may block content in one document matching the rule from being copied to another document, from being shared with other users (e.g., via email), or from being stored on portable devices (e.g., a USB flash drive).

Once a signature representing a DLP incident is generated, the DLP system can match that signature with signatures generated for other DLP incidents. For example, when a user forwards an email with content that triggers a DLP incident, the system can match an incident signature generated for the forwarded email with a signature generated for the original email. This approach allows the DLP system to process DLP incidents generated from the same underlying content in a similar manner. For example, if the original incident was labeled as a false positive, a subsequent incident (which identified based on the matching signature) can also be treated by the DLP system as a false positive, without requiring administrator intervention. Doing so reduces the number of incidents that require administrator review.

In one embodiment, a DLP system generates a signature for an incident or event and stores the signature and relevant details in a repository. An administrator reviews the incident and can assign an event status to be associated with the signature. That is, the administrator may specify whether the content triggering the DLP rule is content that should be blocked (or otherwise subject to the DLP rule). In some cases, contextual information about the event may also be displayed to a DLP system administrator, and the DLP system administrator may use the contextual information and event data to determine whether the content triggering the DLP rule is content that should be blocked or content that triggered a false positive. The characteristics can include, for example, a priority for the event and an indication whether the event was correctly flagged as a DLP event or was a false positive. Once a signature generated for content which triggered a false positive event is identified, the DLP system can determine whether content in a document flagged in a subsequent event matches the signature. If so, the DLP system may log the subsequent as also being a false positive.

In another embodiment, a DLP system can record information about DLP events in a data repository. Information about DLP events may include, for example, an event signature, an event source, and an identity of the user that triggered the event, and so on. A DLP system administrator can filter events saved in the data repository to audit content. Search inputs may include, for example, an input file defining activity that the system administrator wants to search for. The DLP system can generate a signature based on the input file and display events with matching event signatures to a DLP system administrator. Other search inputs may include, for example, user identities, event source identities, time ranges, or other data that can be used in searching for data loss prevention events.

Advantageously, noting that content corresponding to an event signature generated a false positive event allows administrators to efficiently manage DLP systems. Over time, the DLP system can use signatures of false-positives to prevent the DLP system from blocking content matching the signature. Thus, a DLP system can reduce the amount of time a DLP administrator spends in repeatedly flagging events based on the same content as a false positive.

While documents and text are used herein as a reference example, embodiments of the invention may be adapted to work with other forms of content, such as image data or metadata. Generally, if metrics can be used to build a signature to identify a given DLP event or incident, embodiments of the present invention may be used to determine whether a subsequent DLP incident event constitutes a data loss event or a false positive.

FIG. 1 illustrates an example computing environment 100, according to one embodiment. As shown, the computing environment includes a DLP system 120, data store 130, external networks 140, and client systems 150 connected to a network 110.

The DLP system 120 may provide endpoint (data-in-use), networked (data-in-motion) monitoring, or data repository (data-at-rest) monitoring within network 110. As shown, DLP system 120 includes a detection server 122 and a management server 124. Detection server 122 is generally configured to monitor content used on a network (e.g., shared via e-mail messages, published on the Internet, copied from the network to removable storage, etc.) and determine if the content matches a data loss prevention rule used to restrict what activity may be done with that content. For example, in a payment system, detection server 122 could monitor for attempts to transmit credit card numbers across network 110 or to destinations in external networks 140. In some cases, detection server 122 may also be configured to scan content stored in data repositories for content matching a data loss prevention rule. Detection server 122 may scan content in data repositories as a background operation (i.e., while detection server is monitoring network activity for content matching a data loss prevention rule). After determining that content matches a data loss prevention rule, detection server 122 may take action regarding the content based on rules for handling a particular data loss prevention event. For example, if detection server 122 determines that content matches a data loss prevention rule, detection server 122 may quarantine the content pending resolution (a decision to block or allow the content) by a system administrator (e.g., whether to allow an email to be sent). Additionally, detection server 122 may log the activity in event log 132.

Additionally, if detection server 122 determines that content matches a data loss prevention rule, information about content may be transmitted to management server 124. Management server 124 may generate notifications regarding the content, the matching data loss prevention rule, and actions taken by detection server 122 in response to determining that the content matches a data loss prevention rule. Further, management server 124 may allow a system administrator to override actions taken by detection server 122 for a particular event. For example, detection server 122 flagged an e-mail as a data loss event, a system administrator could mark detection of the e-mail as a false positive and allow the e-mail to be sent.

Data store 130 may contain information accessed by DLP system 120 and client systems 150. Data store 130 may store, for example, an event log 132, a user-defined log 134, and rules 136. Event log 132 may record information about events generated by detection server 122. The event log 132 may include, for example, content that triggered event generation by detection server 122, a signature generated to match the content, information about an action detection server 122 took in response to detecting the event, and so on. In some cases, event log 132 may also include information about related events (e.g., a "root cause" or "root event"—whether detection of different events was predicated on the same or similar activity). For example, where a user sends an email that is quarantined by the DLP system, an administrator may review the message and allow it to be sent. In response, DLP system generates a signature of the content that caused the message to be quarantined and records the event as a false positive. If other users then reply or forward the same message, then subsequent DLP events might be generated by the system. In one embodiment, however, the content in a reply or forwarded message will have an incident signature that matches the signature of the original email message, as both signatures are generated from the same content. Thus, the system can automatically label a reply or forward as being a false positive.

User-defined log 134 may be used to store information that can be used by DLP system 120 to determine what action DLP system 120 should take if a DLP event occurs. In some cases, user-defined log 134 may record an event status assigned by an administrator (e.g., a status of being a false positive event, a true positive event, etc.). In such a case, user-defined log 134 may contain signatures corresponding to content that has generated a DLP event later determined to be a false positive, a rule DLP system 120 deemed the event to have violated, data indicating that the event was a false positive (i.e., an event that did not violate the rule), and an amount of variation in future activity that would cause DLP system 120 (and particularly detection server 122) to recognize future activity as the same or substantially similar to the activity recognized as a false positive In other cases, user-defined log 134 may store event status information such as event priority or other information that can be used, for example, in detecting data loss prevention events or auditing data activity in network 110.

Rules 136 contain information used to determine if activity sharing content should be regarded as a DLP event, and if so, what action should be taken in relation to the event. For example, a rule involving personally-identifiable information could define a data format used to match content (e.g., that a U.S. Social Security Number includes nine digits with a pattern of "###-##-####"; that a UK National Insurance Number is a nine-character string with a format of two letters, six numbers, and one letter; that a credit card number can include sixteen digits and an additional three digit CVV code, etc.) and an action that DLP system 120 should take if content is detected (e.g., blocking transmission of this content).

Client devices 150 may be connected to network 110 and generate, access, and share content monitored by DLP system 120. As illustrated, client system $150_1$ is a system used by a DLP system administrator, while client systems $150_2$ and $150_3$ are systems used by other users in network 110. Client systems 150 may include a variety of applications to create, access, send, and receive content. For example, client systems 150 may include an e-mail client 154 used to send and receive email messages. Client systems 150 may also include a publication tool 156 used to publish content to locations over network 110 or external network(s) 140. A USB interface 158 may allow a user to copy content to a removable storage device (e.g., a flash drive or a portable hard drive).

In some cases, DLP system 120 may interact with an e-mail server. After a user sends an e-mail from client system 150, DLP system 120 can scan contents of the e-mail. If the content matches a DLP rule, DLP system 120 can quarantine the e-mail pending review by a system administrator. Otherwise, DLP system 120 forwards the email to a Mail Transfer Agent for processing.

In some cases, DLP system 120 may act as a network gateway for a client device 150 and may monitor content generated, copied, sent, or received by a client device 150 by scanning packets and reconstructing a communication from the scanned packets. Traffic on certain ports may pass through DLP system 120 for processing. For example, a client device may be configured to route traffic on ports corresponding to mail services (e.g., ports 25 or 587 for outgoing email traffic, or port 80 for general internet traffic). If DLP system 120 flags content in traffic as a potential data loss event, DLP system 120 may quarantine the flagged traffic, preventing the flagged traffic from exiting network 110 until a system administrator approves the content.

In another example, DLP system 120 may monitor web forms or file upload mechanisms. In such a case, DLP system 120 may monitor network packets containing web form input (e.g., transmitted using HTTP, GET, POST, or multipart data). After reconstructing the transmitted content (e.g., into a plaintext format), DLP system 120 determines if the content should be flagged as a potential data loss event. For file uploads, DLP system 120 may determine if the uploaded file matches a data loss rule based on the file name or the file contents.

In yet another example, DLP system 120 may be configured to monitor for copy and save operations from networked data stores to portable storage (e.g., USB storage devices connected to a client device 150). For example, DLP system 120 may examine source and destination information of a file copying operation. If a source file includes content that matches a DLP rule and the destination is connected to USB interface 158, DLP system 120 may determine that the content should be flagged as a potential data loss event. Additionally DLP system 120 can monitor file writing operations on USB interface 158. When a user tries to save a file to a destination connected to USB interface 158, DLP system 120 may scan the contents of the file before allowing client device 150 to write the file to the destination. If the file contents include data matching a DLP rule, DLP system 120 may block client device 150 from saving the file on the destination device.

DLP monitoring tool 152 may allow a system administrator to manage DLP services provided by the DLP system 120. For example, the interface 152 may provide a system administrator a list of DLP events for review. When a administrator determines an event is a false positive, the administrator flags it as being a false positive. In response, the DLP monitoring interface 152 may generate a signature from the content triggering the event and store the signature in user-defined log 134. Additionally, DLP monitoring interface 152 may be used to add, remove, and/or modify rules used by DLP system 120 to determine what content or activity constitutes a data loss prevention event and what action DLP system 120 should take in response.

Figure 2:
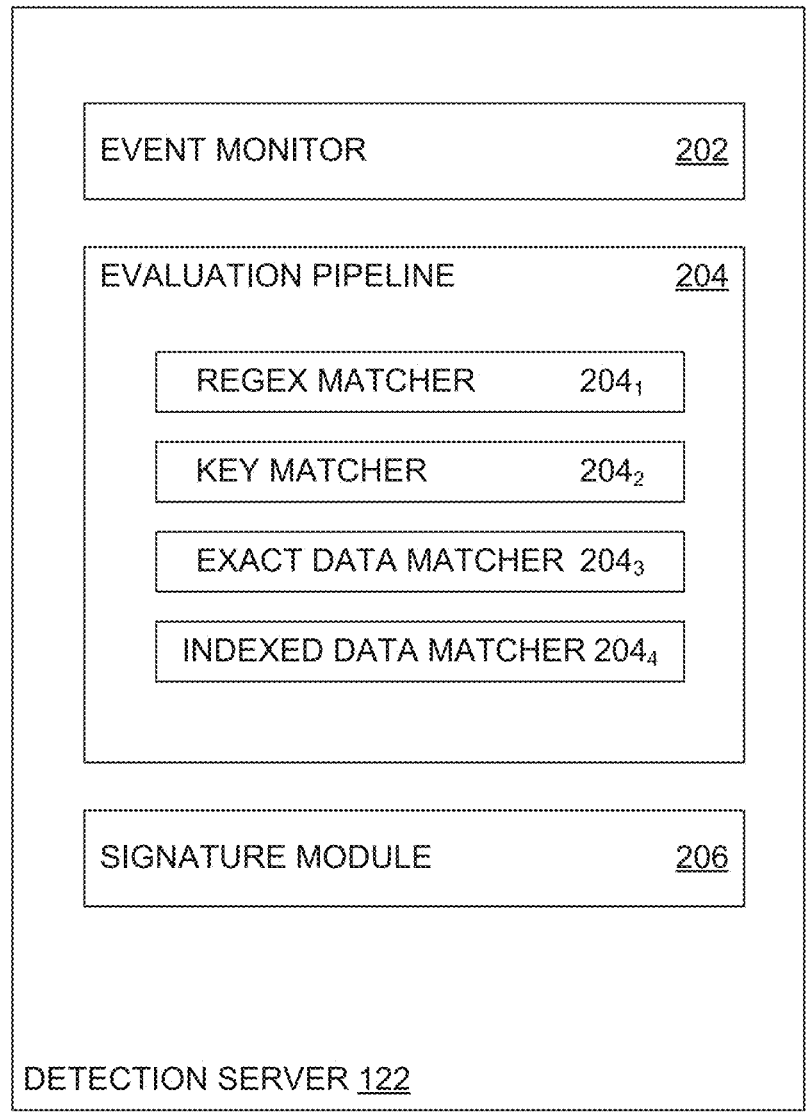
FIG. 2 illustrates an example detection server in a DLP system, according to one embodiment.

FIG. 2 illustrates a block diagram of a detection server 122, according to some embodiments. As illustrated, detection server 142 includes an event monitor 202, evaluation pipeline 204, and signatures 206. Event monitor 202 may monitor activity on network 110 and/or client devices 150. For example, event monitor 202 may monitor the content of traffic transmitted over network 110, requests to copy data to removable storage, and other events on network 110 and/or client devices 150 that may constitute data loss events.

Evaluation pipeline 204 may be configured to identify content which matches a data loss prevention rule. Evaluation pipeline 204 may include a chain of detection components, where each component evaluates content for potential DLP violations. As shown, the detection chain includes at least regular expression matcher $204_1$, keyword matcher $204_2$, metadata matcher $204_3$, and indexed data matcher $204_4$. Additional matching engines may also be included in evaluation pipeline 204, as appropriate. For example, a DLP system may additionally include a matcher for non-textual data input (such as image, video, audio, vector graphics files, etc.), as appropriate.

Regular expression matcher $204_1$ may compare text strings to a predefined pattern of characters. Keyword matcher $204_2$ may be used to determine if traffic or content includes key words or phrases. In one example, keyword matcher $204_2$ may flag content involving the word "confidential" or permutations of "confidential" (e.g., "confidentially," "confidentiality," etc.) as matching a data loss prevention rule. In another example, keyword matcher $204_2$ could flag content which includes a statistically improbable phrase, which is a phrase that is not expected to be present outside of a limited universe of data (e.g., a single document or a set of related documents). If keyword matcher $204_2$ finds a statistically improbable phrase in content, keyword matcher $204_2$ may determine that the network traffic potentially violates a data loss prevention rule. After detecting a regular expression match or a keyword match, detection server 122 may build a match signature representing the incident. A match signature generated to represent a DLP event detected based on a regular expression match may include the regular expression, matching strings, and offsets between the matching strings. A match signature generated to represent a DLP event detected based on keyword match may include the matching words and offsets between each of the matching words or phrases.

An exact data matcher $204_3$ may, for example, compare unstructured data transmitted over network 110 to structured content stored in a database. For example, assume that a payment information database stores customer names, addresses, and payment card information. In such a case, exact data matcher $204_3$ builds an index of the customer names, addresses, and payment card information. If a document includes customer information corresponding to one of the customers in the database, exact data matcher $204_3$ may trigger detection of a DLP event based on an exact match in the unstructured content (i.e., the document) with values from the database. Note, not all of the data corresponding to a customer need be present in a document in order for exact data matcher $204_3$ to trigger detection of a DLP event. For example, a match with a first name, last name, and address, but not a phone number, could trigger a match. More generally, the exact matcher $204_3$ may be configured to use any suitable criteria for determining whether data in a document should trigger a DLP incident. A signature generated to represent a DLP event based on an exact data match could include the unstructured text that matched content stored in the database and information specifying the position of each term in the document triggering the DLP event.

After determining that content being shared (e.g., sending an e-mail, submitting data via an HTML form, saving data to removable storage, etc.) matches a data loss prevention rule, signature module 206 may generate a signature identifying relationships between data (e.g., text, image data, metadata, or any other data that can be subjected to pattern recognition and matching) that triggered the data loss event. As discussed above, signature module 206 may generate signatures based on any kind of data (e.g., text, image data, metadata, etc.), so long as the content can be used to build signatures that identify a given DLP event or incident. For example, signature module 206 may be configured to generate a signature based on text strings and position within a document that triggered identification of an event as a data loss event.

Still further, if evaluation pipeline 204 determines that an event constituted a data loss event based on metadata matcher $204_3$, signature module 206 may generate a signature based on fields triggering a match and the relative distance or hierarchy.

In some cases, signature module 206 may compare a signature generated from content for the event to signatures stored in data store 120. For example, if user-defined log 124 stores records of false positive events, the generated signature may be compared to signatures stored in records of false positive events. If a generated signature matches a false-positive signature, signature module 206 may determine that the detection engine 122 should not perform any further processing on the event (e.g., event logging and event blocking and/or quarantine).

In some cases, a generated signature and a stored signature need not match exactly for an event to be considered the same event. A flexible signature matching rule may be used, for example, to account for data being cut off from successive iterations of an event (e.g., in the case of forwarded e-mails, where a portion of the body of the original e-mail is cut off at some point in time). In some cases, signature module 206 may also analyze context information associated with an event to determine whether an event should be transferred to management server 124 for further processing. The context information may include, for example, the sender or recipient of a message, channel (or source) of the activity that prompted detection server 122 to identify the event as a potential data loss event, and so on. If the signature and additional context information match a previously allowable event, DLP system 120 may allow the event to proceed without transferring the event to management server 124 for processing.

Figure 3:
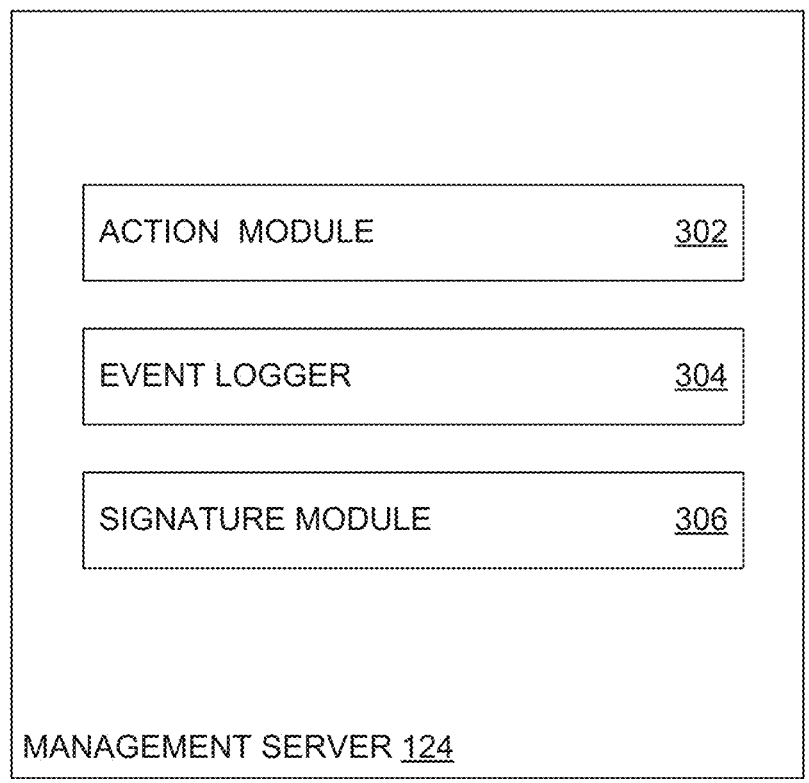
FIG. 3 illustrates an example management server in a DLP system, according to one embodiment.

FIG. 3 illustrates a block diagram of a management server 124, according to some embodiments. As illustrated, management server 144 includes an action module 302, an event logger 304, and signature module 306. After detection server 142 determines that an event is a data loss event (or a potential data loss event), information about the event, such as the signature generated for the event and data about the event (e.g., timestamps, event source, etc.) may be transferred to management server 144. Depending on the rule, action module 302 may block, quarantine, and/or log the event using event logger 304. For example, a rule which prohibits personally identifiable information from being transmitted across network 110 or to destinations in external network(s) 140 may result in action module 302 blocking content including personally identifiable information or quarantining such information in the event that transmission of personally identifiable information is allowable under limited circumstances.

Event logger 304 may record information related to data loss events in event log 122 and user-defined log 124. The record stored in event log 122 may include, for example, a signature representing the content that triggered detection of the event, data about a user and a source for the data loss event, and other information. In some cases, a record stored in event log may further include data correlating the data loss event to a stored signature in user-defined log 124, which may, as described above, be used to associate events with an event status (e.g., false positives, events priority, and so on).

In some cases, event logger 304 may record events in a user-defined log 124 instead of event log 122. For example, if a user-defined log 124 contains information about all false positive events and the event is a false positive, a record of the event can be stored in user-defined log 124. Like event records stored in event log 122, records stored in a user-defined log 124 may include, for example, a signature representing the content that triggered detection of the event and information about the event's relationship to previous false positive events. In other cases, a number of user-defined logs may be maintained for different event priorities. Event logger 304 may record events in the appropriate log based on whether a data loss event is a high priority event (e.g., an event that occurs with a high frequency or is associated with severe consequences if the event were to occur), a low priority event (e.g., an event that occurs infrequently or is associated with minimal consequences if the event were to occur), or some intermediate priority.

Signature module 306 can be used to generate a signature for an event and determine if the event had been previously recorded in an event status log (e.g., a false positive or a priority log). If a generated signature matches (or substantially matches) a previously recorded signature, a record of the event can be stored in the appropriate false positive log or priority log.

Figure 4A:
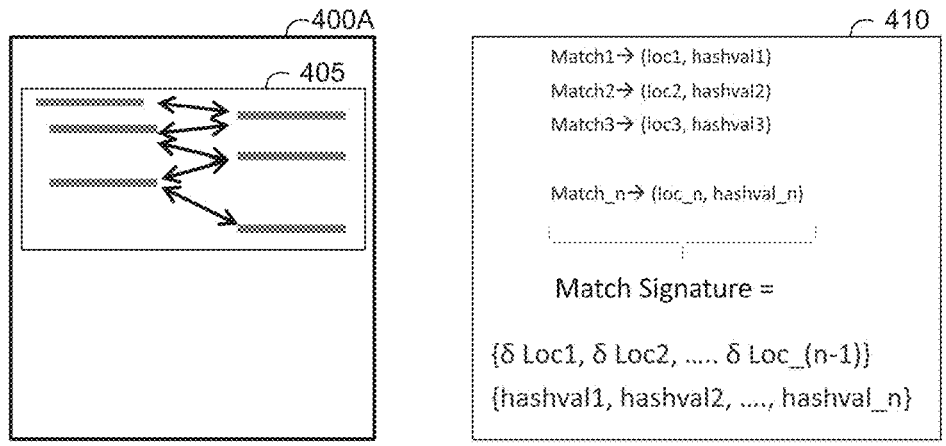
FIG. 4A illustrates an example of an original event and a signature associated with the original event, according to one embodiment.
Figure 4B:
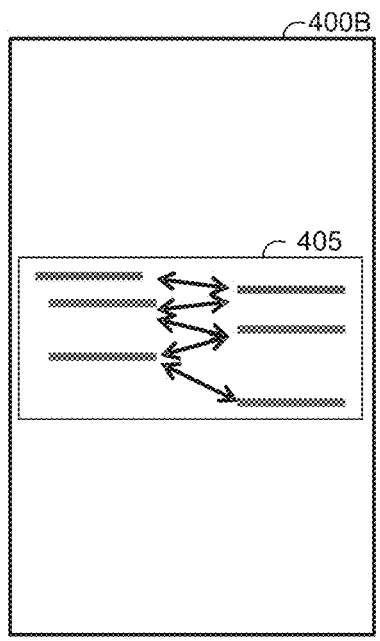
FIGS. 4B and 4C illustrate examples of successor events to the original event illustrated in FIG. 4A, according to one embodiment.
Figure 4C:
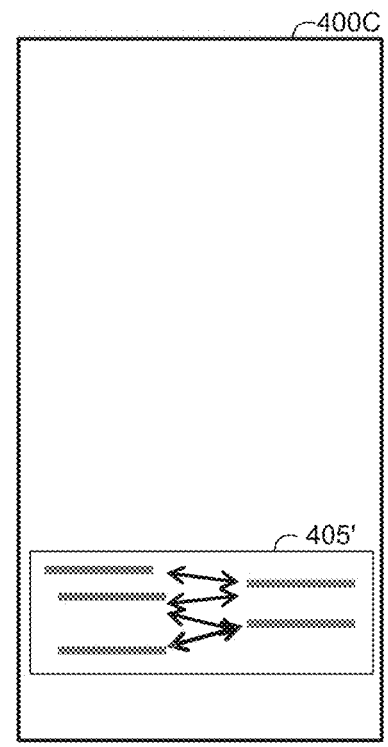

FIGS. 4A-4C illustrate examples of events flagged as data loss events, according to some embodiments. Specifically, FIG. 4A illustrates an e-mail 400A that includes content 405 matching a DLP rule. The content 405 includes strings representing key words or phrases that were flagged by detection server 122 (and specifically by matcher 204) as having violated a DLP rule. The arrows between each string represent an offset between text in the event. The offset between may be a number of characters separating each flagged string.

A signature 410 is designed to represent a specific pattern inherently related to the content that was flagged by a data loss prevention rule. For instance, signature 410 may be based on the location of each string and a digest value representing the strings that violated a data loss prevention rule. In one case, a hash value may be generated for each string flagged by a data loss prevention rule. Each flagged string (except the last) may be associated with a location offset from a previous flagged string. Together, the hash values and offsets provide a signature 410 for the event. As noted, some context information, e.g., a sender and recipient of an email message may be added to the signature. Once generated, the signature 410 can be matched with signatures generated for other incidents. Rules for matching signatures can be exact, requiring events to contain identical strings and identical offsets, or can allow for an inexact match. With inexact matching, events need not be exactly the same in order for a match to be generated. In some cases, events may have at least a minimum number (or percentage of strings and/or offsets) in common with the signature. In some cases, signature 410 may be matched to other signatures based on ranges of distances between flagged strings. In some cases, signature 410 may be matched to other signatures based on variations of matched words (e.g., if signature 410 is generated from data using a variant of a word used in a previously flagged event).

FIG. 4B illustrates a subsequent e-mail 400B including content 405. E-mail 400B may result, for example, from replying or forwarding e-mail 400A. Because e-mail 400B includes content 405, a signature generated from this violating content pattern will match signature 410. Since the signatures associated with the violating patterns generated by e-mails 400A and 400B match, a DLP system can determine that e-mails 400A and 400B are based on the same root incident. Further, if the root incident has been labeled as a false positive, the DLP system may treat the second incident (i.e., the forwarding of email 400A in 400B) as a false positive.

FIG. 4C illustrates e-mail 400C including content 405'. As illustrated, content 405' is not an exact duplicate of content 405. Specifically, FIG. 4C illustrates only five of the six strings and a slightly different offset between the fourth and fifth strings. Such an event may occur, for example, if e-mail 400C is an edited version of e-mails 400A or 400B. While the content 405' in e-mail 400C is not an exact match to content 405 in e-mails 400A and 400B, a DLP system may determine that there are sufficient similarities between a signature generated from 405' and signature 410 and hence determine that the corresponding incidents are related.

Figure 5:
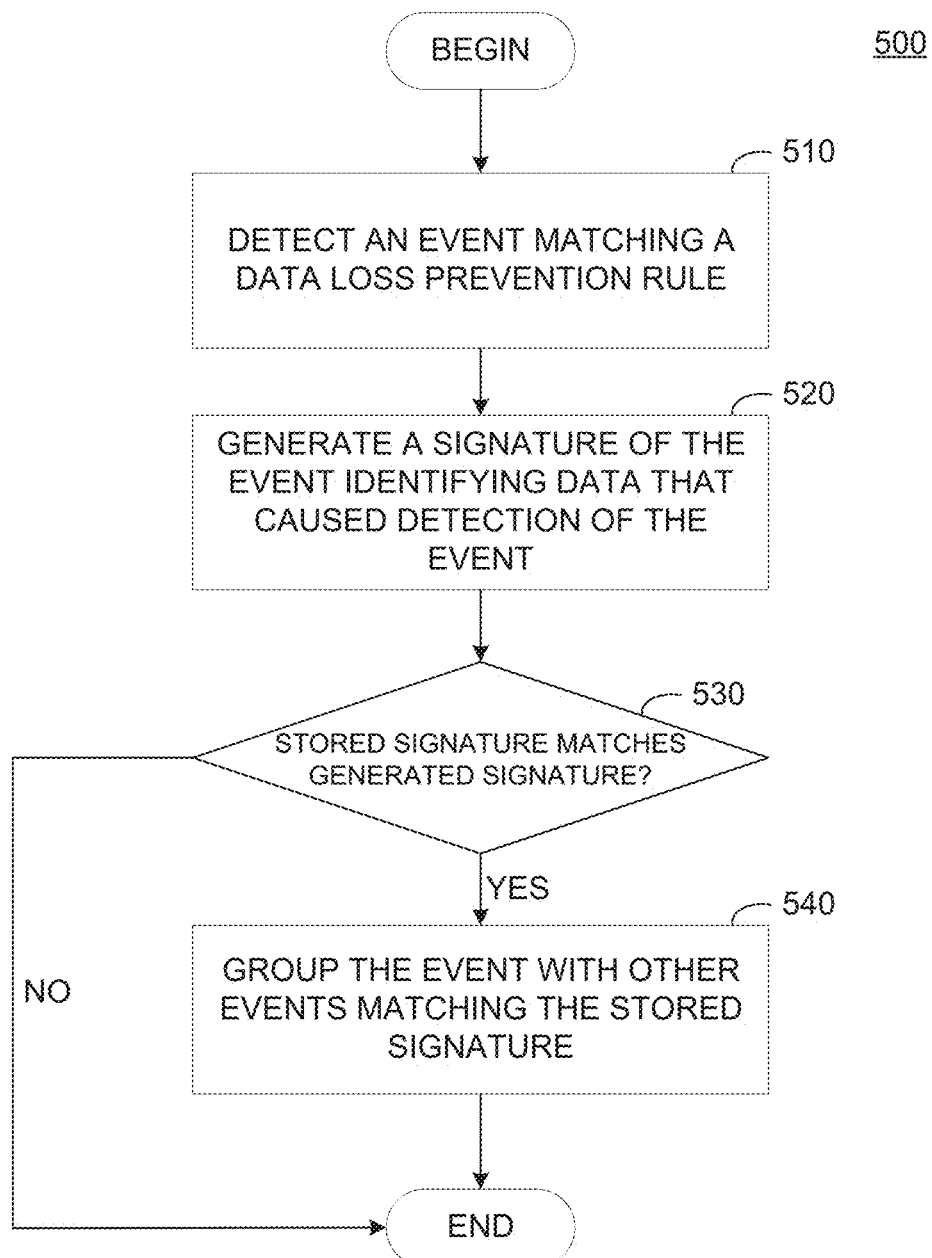
FIG. 5 illustrates a method for grouping similar events together based on an event signature, according to one embodiment.

FIG. 5 illustrates a method 500 to identify data loss events, according to some embodiments. As shown, method 500 begins at 510, where a DLP system detects an event matching a data loss prevention rule. For example, as discussed above, a DLP system can monitor traffic on a network in which the DLP system acts as a gateway or by monitoring activity on client systems in which the DLP system acts as endpoint security. As described above, a detection server may compare rules restricting data from being shared or copied to content in documents being shared, published, or copied by a client system. Depending on the rule, the DLP system can compare content using regular expression matching, keyword matching, metadata matching, exact data matching, or indexed data matching, etc.

After detecting an event, the DLP system generates a signature identifying a specific pattern in the content that triggered the event. The DLP system may generate a signature of an event based on, for example, text strings data and offsets between text strings At 530, the DLP system may determine if a signature stored in an event log matches the generated signature. If the DLP system finds a match between a stored signature and a generated signature, the event is grouped with events matching the stored signature. If the DLP system does not find a match between a stored signature and a generated signature, the DLP system may store the generated signature as a new incident "root signature.

Figure 6:
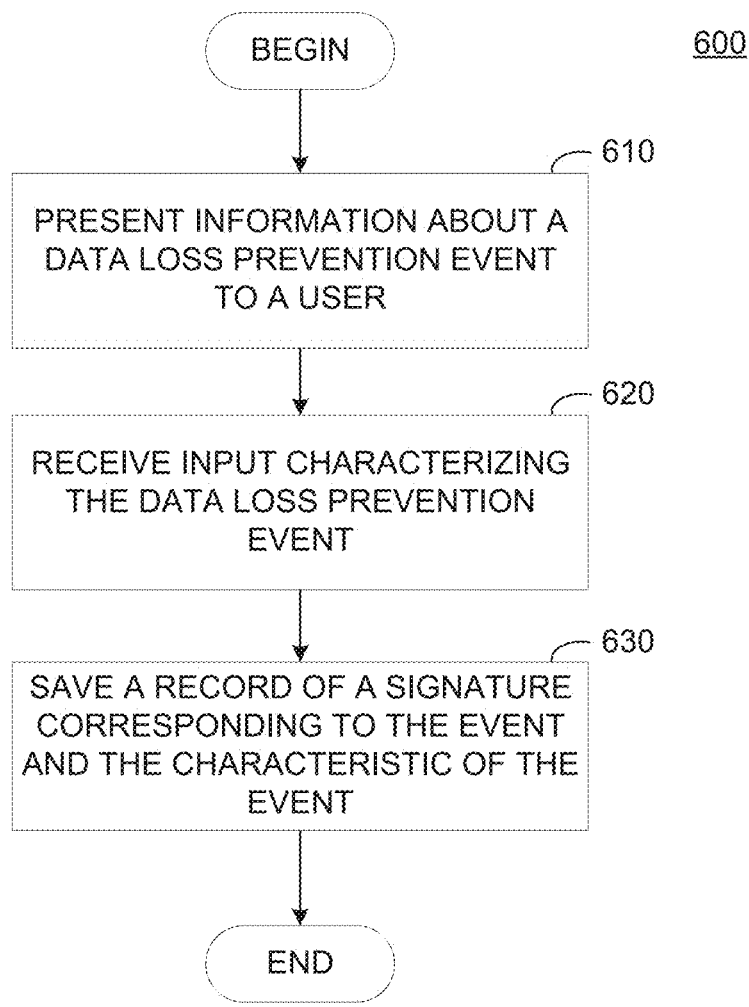
FIG. 6 illustrates a method for characterizing data loss prevention events, according to one embodiment.

FIG. 6 illustrates a method 600 to characterize DLP events, according to some embodiments. As shown, method 600 begins at 610, where the DLP system presents information about a data loss prevention event to a user. In some cases, information about loss prevention events may be displayed based on a user-provided query, which may be provided as a natural language search parameter, a set of keywords, a pattern (e.g., a signature derived from processing an input file), or any other search parameter. The information may include details about a data loss prevention rule and details of events associated with the data loss prevention rule (e.g., a signature, timestamp, user, channel on which data was transmitted, etc.).

At 620, the DLP system receives input characterizing the data loss prevention event. As described above, an input characterizing the data loss prevention event may include designating an event as a false positive, associating a priority or severity value to the event, or other input that can be used to characterize an event. At 630, the characterized data loss prevention event is saved. In some cases, a record of the characterized data loss prevention event may be saved in a user-defined log 124. For example, as described above, a record of an event classified as a false positive may be saved in a log of false positive events. Similarly, records of events classified by priority or severity may be saved in logs corresponding to an event's classified priority or severity level. In some cases, a record of a characterized data loss prevention event may include a signature identifying the event, a timestamp indicating when the event occurred, information about a service or action that triggered the event, the user who triggered the event, and so on.

Figure 7:
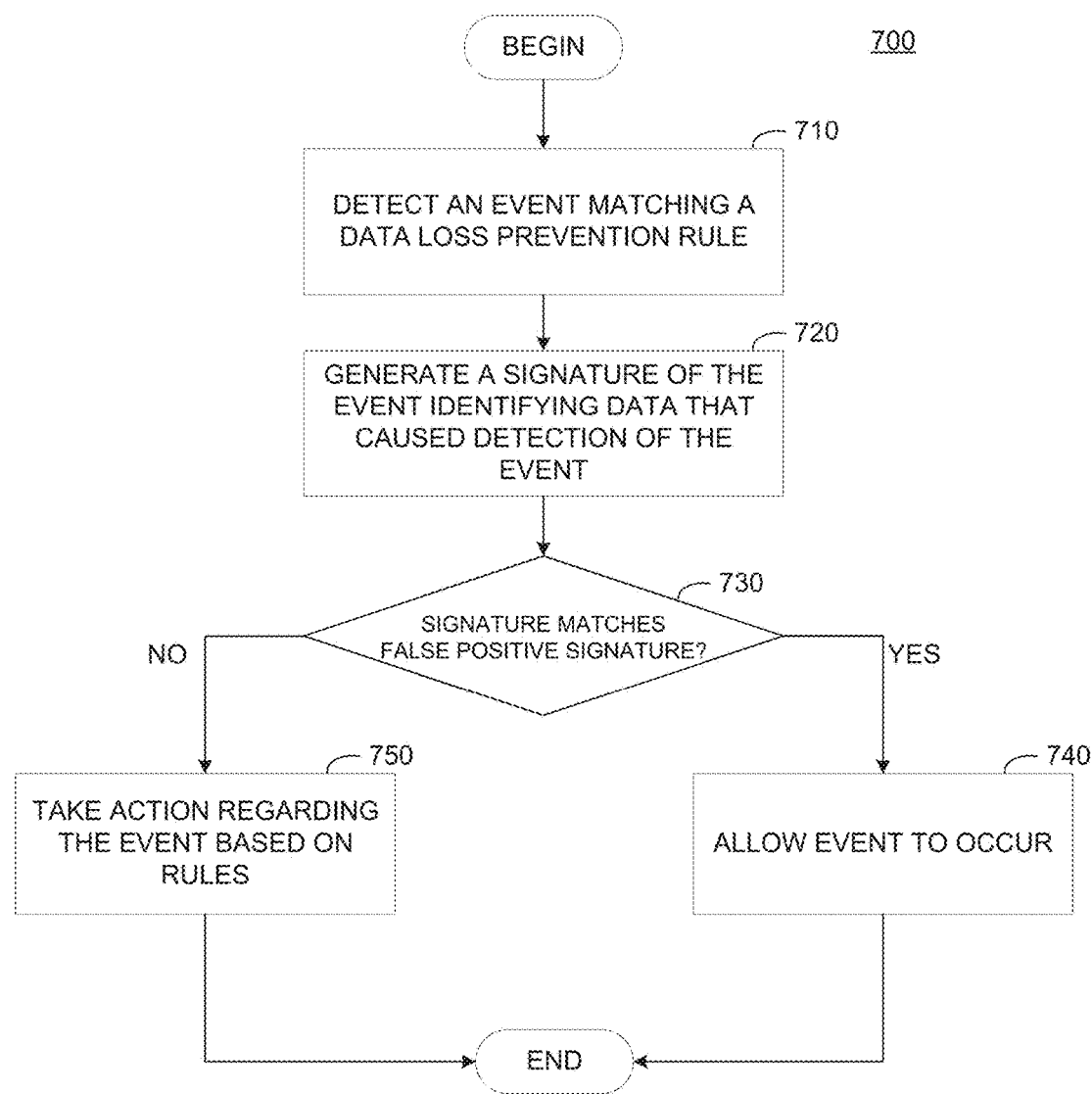
FIG. 7 illustrates a method for processing data loss prevention events based on whether a previous event was flagged as a false positive, according to one embodiment.

Information saved in a user-defined log 124 may be used by a DLP system to determine a response to detecting an event matching a signature saved in a user-defined log (e.g., a false-positive log in which records of events erroneously flagged as data loss events are stored, a priority or severity log, etc.). For example, FIG. 7 illustrates a method 700 for responding to a data loss event with a signature matching a signature associated with a previously stored event, according to some embodiments. Method 700 begins at 710, where a DLP system detects an event matching a data loss prevention rule. At step 720, the DLP system generates a signature of the event. The signature, as discussed above, may be generated from a pattern in the content that triggered the DLP system to flag the event. For example, the signature may include information about content in a document matching a data loss prevention rule and location offsets specifying a position of the relevant content.

At 730, the DLP system compares the generated signature with signatures generated in response to prior data loss events with. If a match is found, then an event status assigned to the matching signature may be assigned to the generated signature. For example, if a signature has been assigned a status of false-positive, the DLP system may label the event as also being a false positive. Further, the DLP system may allow an action associated with the event to occur (e.g., allowing an e-mail server to send a message with content that triggered the DLP event). In allowing the activity associated with the event to occur, the DLP system may also generate a log entry noting that a false positive event was detected.

If a matching signature is not found in a false-positive log, the DLP system may quarantine or otherwise block content from being copied or shared, until being approved by an administrator (step 750). More generally, the DLP system takes action regarding the event based on rules associated with a data loss event. For example, some rules may require the DLP system to block an event from occurring; other rules may allow the DLP system to quarantine an event pending resolution by a system administrator (manually allowing the event to occur or blocking the event from occurring); still other rules may only require that the DLP system generate a log entry for the event.

In other cases, the DLP system may use data recorded in user-defined logs (e.g., false-positive logs, priority or severity logs, etc.) as part of a content auditing procedure. A user can perform a content audit, for example, to determine whether particular content is associated with any recorded incidents. Recorded incidents may be generated, for example, from any user or client device on network 110 or on any service or protocol (e.g., mail services, removable storage, etc.). A user can provide an input file, such as the contents of an e-mail message or a protected file, to the DLP system to generate a match signature. Based on the generated match signature, the DLP system can query a data store for all incidents matching the generated signature. That is, the DLP system can query event logs and user-defined logs (e.g., false positive logs) to determine whether events were flagged by the DLP system as a data loss event.

Figure 8:
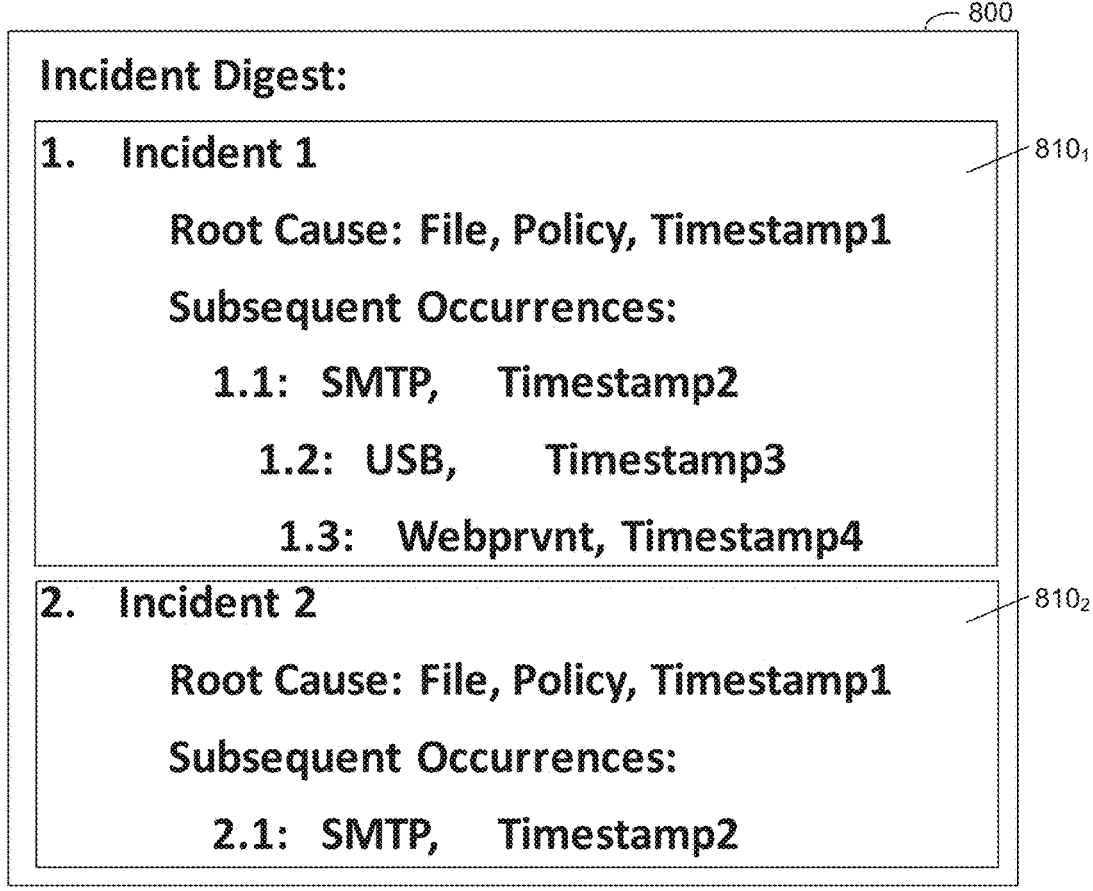
FIG. 8 illustrates an example display of data loss prevention events grouped by the root cause of the events, according to one embodiment.

FIG. 8 illustrates an example interface 800 used to display groups of related data loss incidents, according to some embodiments. As illustrated, the DLP system may group incidents based on the signature and the context of the events and display groups of incidents 810 separately. As illustrated, group 810$_1$, as displayed in interface 800, illustrates a group of related incidents with an original incident and three subsequent occurrences: attempts to send an e-mail, save a file to removable storage, and upload the file to the Internet. Group 820$_2$ illustrates a group of related incidents with an original event and a single subsequent occurrence (of sending an e-mail). Displaying related data loss incidents in groups based on an "original" or "root cause" event may allow an administrator to visualize the origin and flow of content that was flagged as violations of a DLP rule and allow for easier remediation of related events.

Using a set of e-mails as an example, a DLP system could group incidents based on timestamps associated with each event (i.e., each e-mail flagged as a data loss event). For example, the DLP system could consider a set of e-mails to be related if a timestamp associated with each e-mail falls within some time offset from an "original" event. In other cases, the DLP system could group incidents together on a per-user basis, a per-channel basis (e.g., whether the event was associated with an e-mail message, attempted publication over HTTP or FTP, attempts to download to removable storage via a USB interface, or any other appropriate basis.

Figure 9:
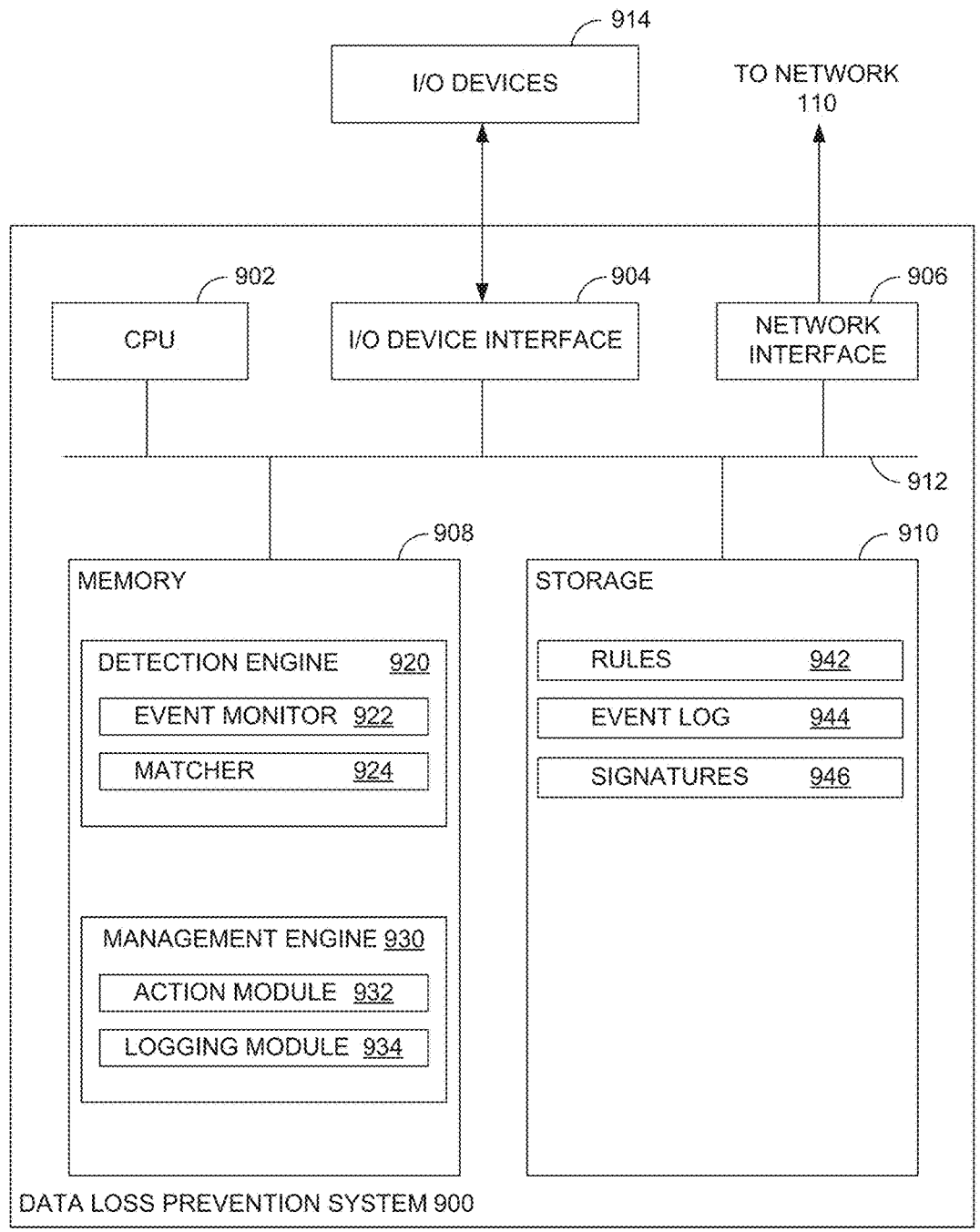
FIG. 9 illustrates an example data loss prevention system that can be trained to process events based on feedback received for previous events, according to an embodiment.

FIG. 9 illustrates an example DLP system 900 that monitors activity for data loss events based on defined data loss prevention rules and user-provided inputs, according to an embodiment. As shown, the DLP system 900 includes, without limitation, a central processing unit (CPU) 902, one or more I/O device interfaces 904 which may allow for the connection of various I/O devices 914 (e.g., keyboards, displays, mouse devices, pen input, etc.) to the DLP system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, memory 908, and storage 910. CPU 902 is included to be representative of a single CPU, multiple CPUs, a single CPU having multiple processing cores, and the like. Additionally, the memory 908 is included to be representative of a random access memory. Furthermore, the storage 910 may be a disk drive. Although shown as a single unit, the storage 910 may be a combination of fixed and/or removable storage devices, such as fixed disc drives, removable memory cards or optical storage, network attached storage (NAS), or a storage area-network (SAN).

As shown, memory 908 includes a detection engine 920 and an management engine 930. Storage 910 includes rules 942, event log 944, and signature 946. As discussed above, detection engine 920 may include an event monitor 922 and a matcher 924. The event monitor may be configured to monitor traffic on network 110 (via network interface 906). Matcher 924 may be configured to receive event information from event monitor 922 and determine whether content matches a data loss prevention rule (e.g., through regular expression matching, keyword matching, metadata matching, exact data matching, indexed data matching, or some combination thereof).

As described, if detection engine 920 flags an event as a data loss event based on rules 942 in storage 910, detection engine 920 may transfer data about the event to management engine 930 for further processing. Management engine 930 may include an action module 932 and a logging module 934. Action module 932 may determine how the DLP system will respond to an event flagged by detection engine 920 based on an action associated with a rule and also based on previous events logged in event log 944 (e.g., whether similar events were flagged as false positives). As described herein, action module 932 may be configured to block data from leaving or being transmitted within network 110, quarantine activity pending resolution by a DLP system administrator, log events, or perform other appropriate actions in response to event detection. A logging module 934 may write information about events to a log in storage 910 (e.g., event log 944).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    identifying an occurrence of a data loss prevention (DLP) incident triggered by content and a DLP rule, wherein the content includes at least a data element and a position element;
    generating a first signature representing the DLP incident based on the content, wherein the first signature is generated from a plurality of text strings in the data element and wherein the position element comprises offsets between pairs of the text strings;
    comparing the first signature to one or more second signatures generated from other DLP incidents associated with the DLP rule;
    upon determining the first signature matches at least one of the second signatures:
        assigning a status of the matching second signature to the first signature, wherein the status of matching second signature is a false-positive, and
        performing an action with the content associated with the DLP incident that would otherwise be blocked as a result of the DLP incident;
    identifying a collection of DLP incidents matching the second signature;
    identifying a root DLP incident in the collection of DLP incidents; and
    grouping the collection of DLP incidents relative to the root DLP incident.

2. The method of claim 1, wherein the status of the matching second signature is a false-positive.

3. The method of claim 2, further comprising, performing an action with the content associated with the DLP incident, wherein the action would otherwise be blocked as a result of the DLP incident.

4. The method of claim 1, wherein the performing the action comprises one of sending an email which includes the content, copying a document which includes the content to a portable storage device, and copying the content from a document to another document.

5. The method of claim 1, further comprising:
    upon determining the first signature does not match at least one of the second signatures, blocking an action from being performed with the content.

6. The method of claim 5, further comprising:
    receiving input indicating that the DLP incident is a false positive; and
    assigning a status of a false positive to the first signature.

7. A non-transitory computer-readable storage medium storing instructions, which, when executed on a processor, causes the processor to perform an operation comprising:
    identifying an occurrence of a data loss prevention (DLP) incident triggered by content and a DLP rule, wherein the content includes at least a data element and a position element;
    generating a first signature representing the DLP incident based on the content, wherein the first signature is generated from a plurality of text strings in the data element and wherein the position element comprises offsets between pairs of the text strings;
    comparing the first signature to one or more second signatures generated from other DLP incidents associated with the DLP rule;
    upon determining the first signature matches at least one of the second signatures:
        assigning a status of the matching second signature to the first signature, wherein the status of matching second signature is a false-positive, and
        performing an action with the content associated with the DLP incident that would otherwise be blocked as a result of the DLP incident;
    identifying a collection of DLP incidents matching the second signature;
    identifying a root DLP incident in the collection of DLP incidents; and
    grouping the collection of DLP incidents relative to the root DLP incident.

8. The non-transitory computer-readable storage medium of claim 7, wherein the operation further comprises:
    upon determining the first signature does not match at least one of the second signatures, blocking an action from being performed with the content.

9. The non-transitory computer-readable storage medium of claim 8, wherein the operations further comprise:
receiving input indicating the DLP incident is a false positive; and
assigning an event status of a false positive to the first signature.

10. A system, comprising:
a processor; and
a memory storing code, which, when executed on the processor, causes the processor to perform an operation comprising:
identifying an occurrence of a data loss prevention (DLP) incident triggered by content and a DLP rule, wherein the content includes at least a data element and a position element,
generating a first signature representing the DLP incident based on the content, wherein the first signature is generated from a plurality of text strings in the data element and wherein the position element comprises offsets between pairs of the text strings,
comparing the first signature to one or more second signatures generated from other DLP incidents associated with the DLP rule,
upon determining the first signature matches at least one of the second signatures;
assigning a status of the matching second signature to the first signature, wherein the status of matching second signature is a false-positive; and
performing an action with the content associated with the DLP incident that would otherwise be blocked as a result of the DLP incident;
identifying a collection of DLP incidents matching the second signature,
identifying a root DLP incident in the collection of DLP incidents, and
grouping the collection of DLP incidents relative to the root DLP incident.

11. The system of claim 10, wherein the operation further comprises:
upon determining the first signature does not match at least one of the second signatures, blocking an action from being performed with the content.

12. The system of claim 11, wherein the operation further comprises:
receiving input indicating the DLP incident is a false positive; and
assigning a status of a false positive to the first signature.

* * * * *